(12) United States Patent
Schultz et al.

(10) Patent No.: US 11,407,123 B2
(45) Date of Patent: Aug. 9, 2022

(54) SYSTEMS AND METHODS FOR A TELESCOPING SUCTION GRIPPER ASSEMBLY

(71) Applicant: AMP Robotics Corporation, Louisville, CO (US)

(72) Inventors: Carter J. Schultz, Lafayette, CO (US); Brian J. Leach, Denver, CO (US); Alexander C. Kee, Denver, CO (US); Matanya B. Horowitz, Golden, CO (US); Mark Baybutt, Superior, CO (US)

(73) Assignee: AMP Robotics Corporation, Louisville, CO (US)

( * ) Notice: Subject to any disclaimer, the term of this patent is extended or adjusted under 35 U.S.C. 154(b) by 175 days.

(21) Appl. No.: 16/843,162

(22) Filed: Apr. 8, 2020

(65) Prior Publication Data

US 2020/0338758 A1 Oct. 29, 2020

Related U.S. Application Data

(60) Provisional application No. 62/838,746, filed on Apr. 25, 2019.

(51) Int. Cl.
*B25J 15/06* (2006.01)
*B25J 9/16* (2006.01)
(Continued)

(52) U.S. Cl.
CPC .......... *B25J 15/0616* (2013.01); *B25J 9/003* (2013.01); *B25J 9/1612* (2013.01); *B25J 9/1697* (2013.01);
(Continued)

(58) Field of Classification Search
CPC .... B25J 15/0616; B25J 15/0658; B25J 9/106; B25J 9/1612; B25J 9/1697; B25J 18/025; B65G 47/914; F16C 29/02
(Continued)

(56) References Cited

U.S. PATENT DOCUMENTS 4,604,787 A 8/1986 Silvers, Jr.
4,707,013 A * 11/1987 Vranish .................. B25J 15/026
294/119.1
(Continued)

FOREIGN PATENT DOCUMENTS

CN 109058641 A 12/2018
EP 1129829 A1 * 9/2001 .......... B25J 15/0616
(Continued)

OTHER PUBLICATIONS

International Searching Authority, "International Search Report and Written Opinion from PCT Application No. PCT/US2020/029579", dated Jul. 24, 2020, pp. 1 through 16, Published: WO.
(Continued)

*Primary Examiner* — Dean J Kramer
(74) *Attorney, Agent, or Firm* — Van Pelt, Yi & James LLP

(57) ABSTRACT

Systems and methods for a telescoping suction gripper assembly are provided. In one embodiment, a robotic system comprises: a robot comprising a robotic actuator and at least one robotic arm mechanically coupled to the robotic actuator; a telescoping suction gripper assembly comprising a telescoping member and a suction gripper mechanism, wherein a first end of the telescoping member is coupled to a vacuum supply conduit via a first flexible conduit member and a second end of the telescoping member is coupled to the suction gripper mechanism by a second flexible conduit member, and wherein the suction gripper mechanism is
(Continued)

pivotally coupled to the at least one robotic; wherein the telescoping member is configured to adjust in length in response to the at least one robotic arm relocating the suction gripper mechanism from a first position to a second position.

17 Claims, 8 Drawing Sheets

(51) Int. Cl.
*B25J 18/02* (2006.01)
*B25J 15/04* (2006.01)
*B25J 19/00* (2006.01)
*F16C 29/02* (2006.01)
*G05B 15/02* (2006.01)
*B25J 9/00* (2006.01)

(52) U.S. Cl.
CPC .......... *B25J 15/04* (2013.01); *B25J 15/0408* (2013.01); *B25J 15/0658* (2013.01); *B25J 15/0683* (2013.01); *B25J 18/025* (2013.01); *B25J 19/0058* (2013.01); *F16C 29/02* (2013.01); *G05B 15/02* (2013.01)

(58) Field of Classification Search
USPC .......................................................... 294/65
See application file for complete search history.

(56) References Cited

U.S. PATENT DOCUMENTS

| | | | |
|---|---|---|---|
| 5,462,311 A | 10/1995 | Cipolla | |
| 8,615,123 B2 | 12/2013 | Dabic | |
| 8,714,903 B2 * | 5/2014 | Feng | B25J 9/0051 414/735 |
| 8,720,298 B2 * | 5/2014 | Lehmann | B25J 19/0025 74/490.06 |
| 9,649,771 B2 * | 5/2017 | Mihara | B25J 9/0051 |
| 10,207,296 B2 | 2/2019 | Garcia | |
| 10,625,304 B2 | 4/2020 | Kumar | |
| 10,710,119 B2 | 7/2020 | Kumar | |
| 10,722,922 B2 | 7/2020 | Kumar | |
| 2001/0019692 A1 | 9/2001 | Ehrat | |
| 2012/0165106 A1 * | 6/2012 | Eltner | F16C 3/03 464/162 |
| 2014/0251058 A1 | 9/2014 | Mihara | |
| 2017/0232479 A1 | 8/2017 | Pietzka | |
| 2019/0084012 A1 * | 3/2019 | McCoy, Jr. | B07C 5/3422 |
| 2020/0290088 A1 | 9/2020 | Kumar | |
| 2020/0368786 A1 | 11/2020 | Kumar | |
| 2021/0229133 A1 | 7/2021 | Kumar | |
| 2021/0346916 A1 | 11/2021 | Kumar | |
| 2022/0016675 A1 | 1/2022 | Kumar | |
| 2022/0023918 A1 | 1/2022 | Kumar | |

FOREIGN PATENT DOCUMENTS

| | | |
|---|---|---|
| EP | 2301726 A1 | 3/2011 |
| WO | 2009046761 | 4/2009 |
| WO | 2016029299 | 3/2016 |
| WO | 2018036634 A1 | 3/2018 |
| WO | 2019060489 A2 | 3/2019 |

OTHER PUBLICATIONS

"Telescopic Wand—Friction Lock Top and Bottom", originally downloaded Mar. 27, 2019, p. 1, https://builtinvacuum.com/parts/all/accessories/extension-tubes/telescopic-wand-friction-lock/.

International Searching Authority, "International Search Report and Written Opinion from PCT Application No. PCT/US2020/027199", from Foreign Counterpart to U.S. Appl. No. 16/843,162, filed Jun. 15, 2020, pp. 1 through 12, Published: WO.

* cited by examiner

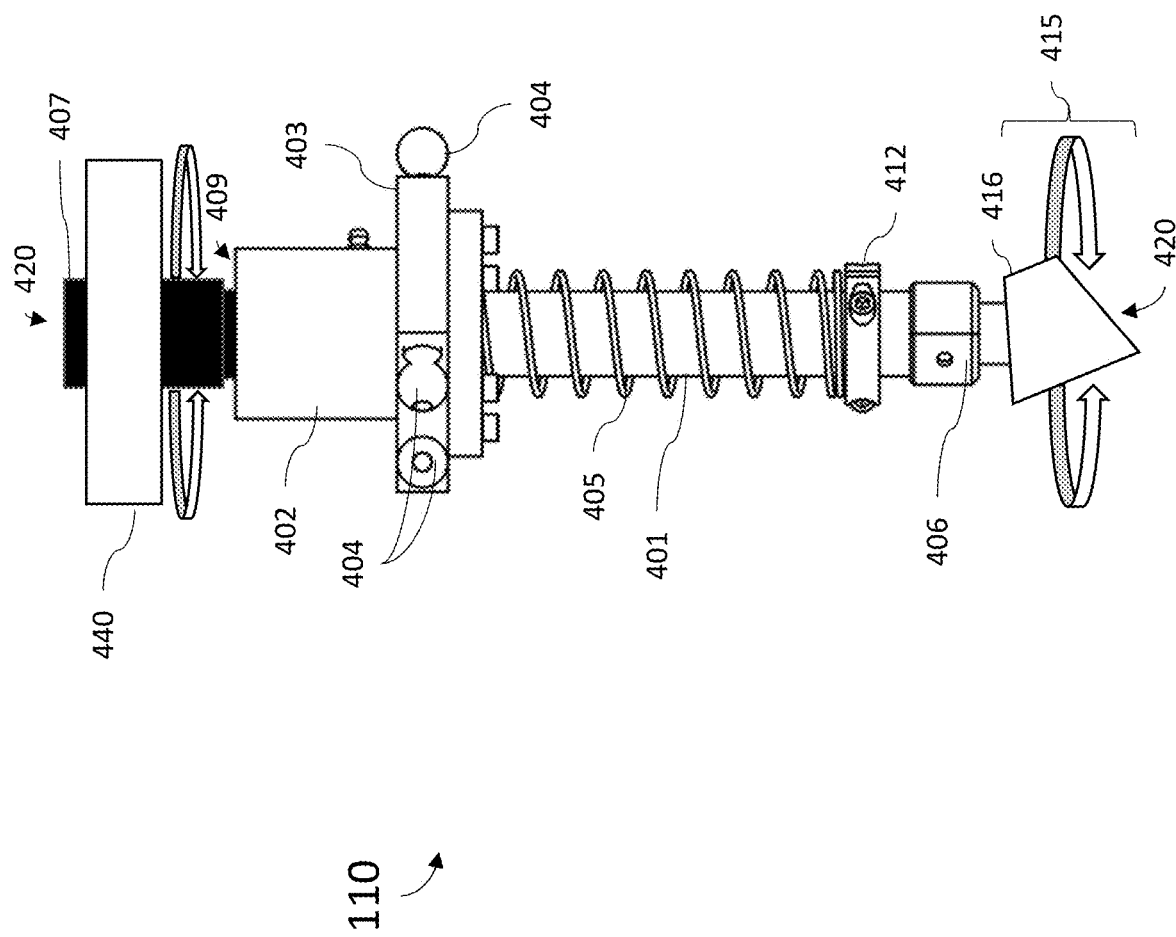

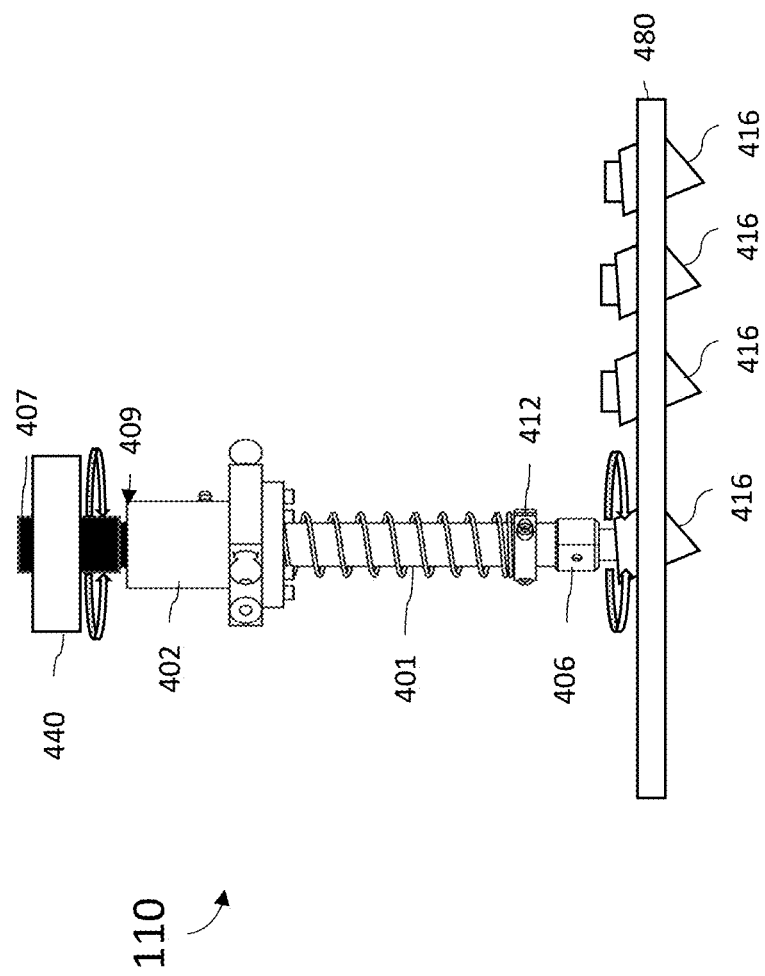

SYSTEMS AND METHODS FOR A TELESCOPING SUCTION GRIPPER ASSEMBLY

CROSS-REFERENCE TO RELATED APPLICATIONS

This application is a U.S. patent application claiming priority to, and the benefit of, U.S. Provisional Patent Application No. 62/838,746, titled "SYSTEMS AND METHODS FOR A TELESCOPING SUCTION GRIPPER ASSEMBLY" filed on Apr. 25, 2019, which is incorporated herein by reference in its entirety.

BACKGROUND

In many automated sorting systems, objects are transported on a conveyor (such as, but not limited to, a conveyor belt) and sorting robots identify and/or select objects to be removed from the conveyor. For example, in a mail package sorting facility, robots using vacuum activated suction grippers may grab hold of a package using the suction gripper, and then relocate the package to another conveyor or sorting bind. Generally speaking, the shapes of such packages are generally predictable (for example, having easily-defined regular box, envelope or cylindrical shapes). Because of this predictability, the suction grippers may be specifically designed to interface with such objects to form a quasi-complete seal that is sufficient to allow the gripper to exert the necessary suction force to hold the object using only a minimal airflow.

In other types of sorting facilities however, such as waste and recycling sorting facilities, the objects that must be sorted are not nearly as likely to have predictable and easily-defined regular shapes. Consequently, the ability for a generic suction gripper to predictably obtain a quasi-complete seal with any particular object is diminished. One way to address this problem is to compensate for the less complete seal by increasing the volumetric airflow of the vacuum at the suction gripper to the degree necessary to secure a hold on the object. Doing so requires a corresponding increase in the size of the flexible tubing that connects the suction gripper to the vacuum source so that the desired volumetric airflow can be achieved. The use of larger tubing, however, creates additional problems. For example, larger tubing has more mass which increases the load burden on the sorting robot that positions the suction gripper. Larger tubing requires correspondingly larger tubing support and routing fixtures, each of which have mass that increases the load burden on the sorting robot. Larger tubing reduces the free space available for the sorting robot to maneuver its appendages, increasing the likelihood of binding or kinks in the tubing or interference with robot motions. Moreover, operation of the robotic appendages that position the suction gripper require very rapid positioning and re-positioning such that the larger tubing material may experience inertial forces that have a detrimental effect on the tubing material wear and rate of deterioration.

For the reasons stated above and for other reasons stated below which will become apparent to those skilled in the art upon reading and understanding the specification, there is a need in the art for systems and methods for a telescoping suction gripper assembly.

SUMMARY

The Embodiments of the present disclosure provide systems and methods for a telescoping suction gripper assembly and will be understood by reading and studying the following specification.

Systems and methods for a telescoping suction gripper assembly are provided. In one embodiment, a robotic system comprises: a robot comprising a robotic actuator and at least one robotic arm mechanically coupled to the robotic actuator; a telescoping suction gripper assembly comprising a telescoping member and a suction gripper mechanism, wherein a first end of the telescoping member is coupled to a vacuum supply conduit via a first flexible conduit member and a second end of the telescoping member is coupled to the suction gripper mechanism by a second flexible conduit member, and wherein the suction gripper mechanism is pivotally coupled to the at least one robotic; wherein the telescoping member is configured to adjust in length in response to the at least one robotic arm relocating the suction gripper mechanism from a first position to a second position.

DRAWINGS

Embodiments of the present disclosure can be more easily understood and further advantages and uses thereof more readily apparent, when considered in view of the description of the preferred embodiments and the following figures in which:

FIG. 4 is a diagram illustrating an example suction gripper mechanism for one embodiment of the present disclosure;

FIG. 4A is a diagram illustrating an example embodiment of a suction gripper mechanism in combination with an suction cup tool changer.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address the deficiencies of the prior art by introducing a telescoping suction gripper assembly for use with robotic sorting systems and other applications. As described in greater detail below, the telescoping suction gripper assembly includes a telescoping member whose component elements provide a sealed conduit to establish and maintain a vacuum produced suction force at robotically positioned suction gripper, even while the position of the suction gripper is being rapidly extended and retracted. Moreover, such embodiments avoid the need to secure and route flexible tubing thus avoiding the kinking, binding and interference issues discussed above.

Figure 1:
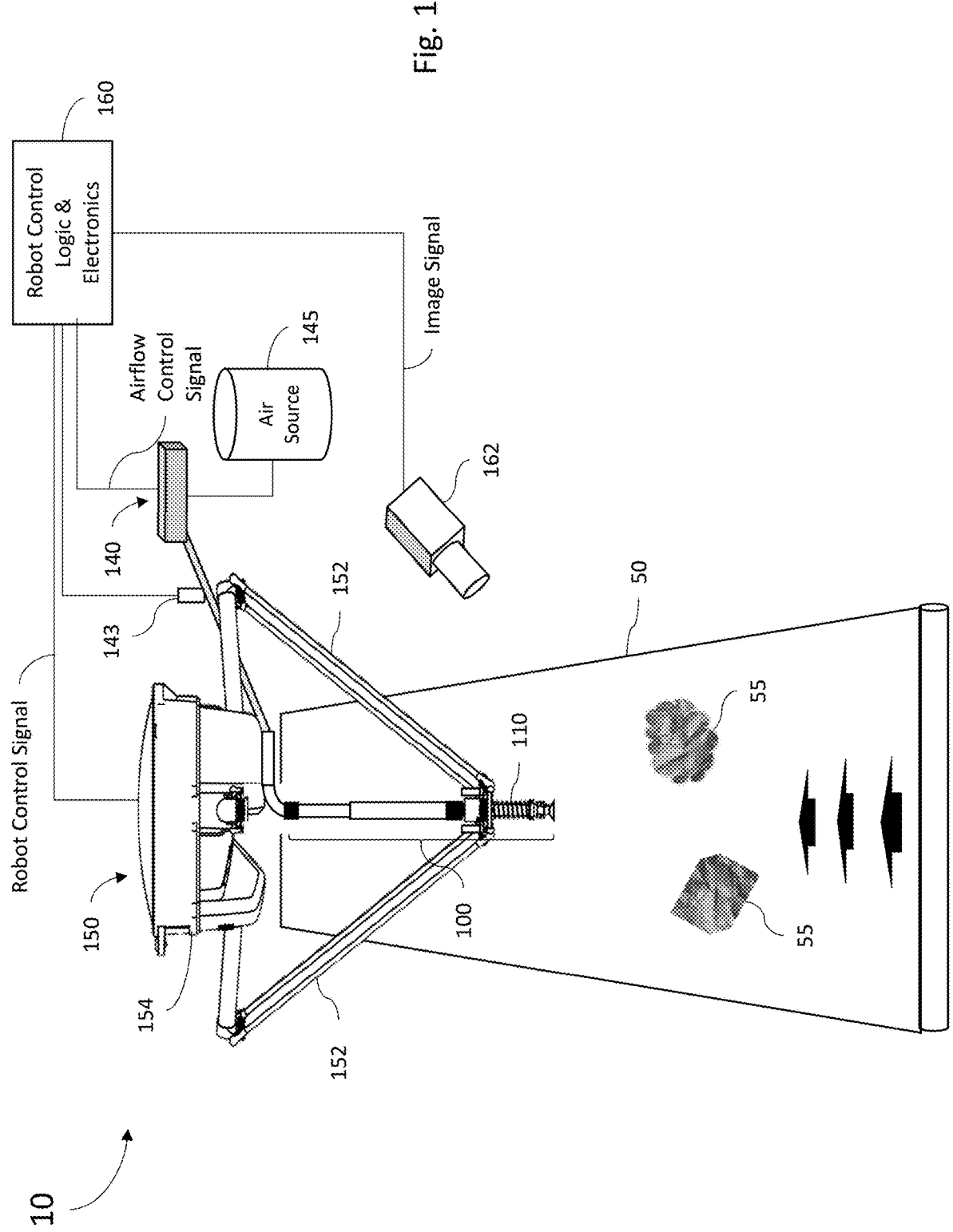
FIG. 1 is a diagram illustrating an example robotic vacuum sorting system of one embodiment of the present disclosure.

FIG. 1 is a diagram illustrating an example robotic vacuum sorting system 10 of one embodiment of the present disclosure. As shown in the example of FIG. 1, a suction gripper mechanism 110 of a telescoping suction gripper assembly 100 is pivotally mounted to a lower base of a sorting robot 150 and driven to desired positions by one or more arms 152 of the sorting robot. As the term is used herein, a robot refers to a mechanical apparatus controlled by a controller (for example, a computer or other logic processor) that used to automatically perform physical tasks. In the embodiment of FIG. 1, the sorting robot 150 it utilized to position the suction gripper mechanism 110 and airflows generated through the suction gripper mechanism 110 are controlled to capture and release target objects. A target object, as the term is used herein, refers to a physical object that is the target of a capture action (i.e., a physical object that has been identified for capture by the system).

In some embodiments, system 10 may supply airflow to the suction gripper 110 via vacuum system 140. In some embodiments, the vacuum system 140 may be further pneumatically coupled to an air source 145, which may comprise a blower, an air compressor, a compressed air storage tank, or some combination thereof. Although this disclosure may refer to "air" with regards to "airflow", "air compressor" and other elements, it should be understood that the term "air" is used in a generic sense to refer to any compressible gas or minute of gasses. In various alternate embodiments, elements of the vacuum system 140 may be at least partially integral, or mounted, to the sorting robot 150, or may be remotely located way from the sorting robot 150.

In some embodiments, the sorting robot 150 and vacuum system 140 are coupled to and controlled by robot control logic and electronics 160. Robot control logic and electronics 160 may comprise or otherwise be implemented with one or more processors coupled to a memory and programmed to execute code to implement the function attributed to robot control logic and electronics 160 described herein. As such, to communicate control signals, robot control logic and electronics 160 may further comprise elements to generate electrical and/or control pneumatic signals to the sorting robot 150 and vacuum system 140. In some implementations, robotic vacuum sorting system 10 further comprises at least one imaging device 162 (which may comprise, for example, an infrared camera, visual spectrum camera, or some combination thereof) directed at a conveyer mechanism 50 (which may comprise a conveyor belt, for example) that transports target objects (shown at 55) within the operating reach of the sorting robot 150. The imaging device 162 produces an image signal that is delivered to the robot control logic and electronics 160 and which may be used by robot control logic and electronics 160 to send control signals to the sorting robot 150 to position the suction gripper 110, and send airflow control signals to the vacuum signal 140, in order to initiate a capture action, as further described below. In some embodiments, the robotic vacuum sorting system 10 may also comprise a pressure sensor 143 providing a signal to the robot control logic and electronics 160 so that it may vacuum is successfully achieved.

For the example embodiment of FIG. 1, an actuator 154 (which may be referred to as a robotic actuator) controls the position of the arms 152 (which may be referred to as robotic arms) in response to control signals from the robot control logic and electronics 160 in order to control the position of the suction gripper mechanism 110. In some embodiments, the distal end of the robotic arms 152 may be configured to engage with mounting points on the suction gripper mechanism 110. Although the sorting robot 150 shown in 1 is shown as comprising two robotic arms 152, it should be appreciated that in other implementations, sorting robot 150 may comprise any number of one or more robotic arms 152.

Figure 2:
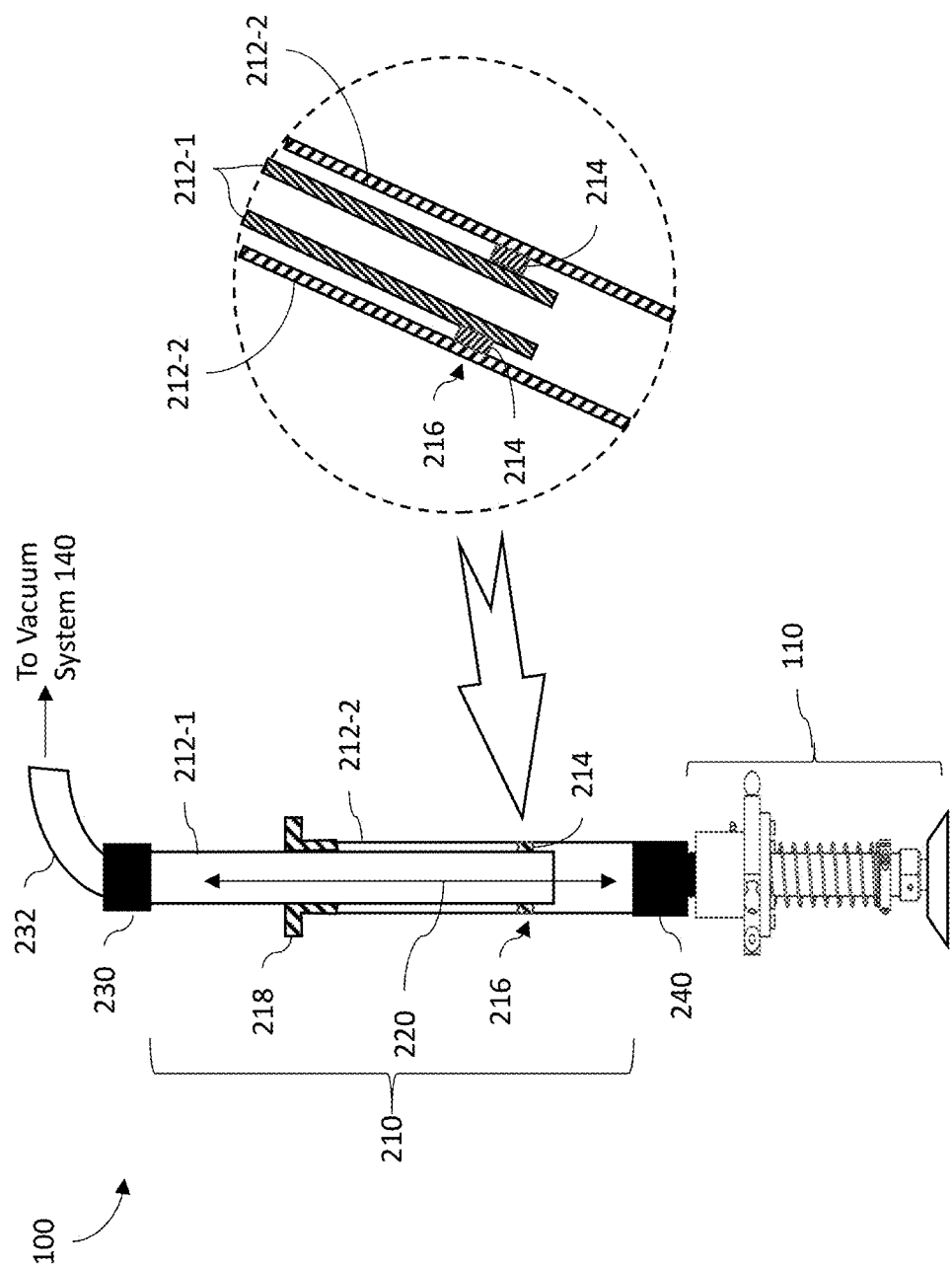
FIG. 2 is a diagram illustrating an example telescoping suction gripper assembly of one embodiment of the present disclosure.

Referring to FIG. 2, one example of the telescoping suction gripper assembly 100 is shown as comprising a telescoping member 210 that includes a plurality of pipes 212 (shown as 212-1 and 212-2). In the particular embodiment shown in FIG. 1, the telescoping member 210 comprises two pipes 212, wherein a first pipe 212-1 has an outer diameter sized and shaped to fit inside a second pipe 212-2. It should be understood that in other embodiments, the telescoping member 210 may comprise two or more pipes 212 having their respective inner and outer diameters sized to similarly provide for telescoping extension and retraction actions as described herein.

In one embodiment, the first pipe 212-1 may comprise a radially and axially rigid tube or pipe structure configured to fit inside of a second radially and axially rigid second pipe 212-2. A seal material 214 is utilized to form a seal 216 between the inner diameter of the larger-diameter pipe 212-2 and the outer diameter of the relatively smaller inner pipe 212-1. For embodiments where the telescope member 210 comprises two or more segments of pipes, each adjacent neighboring pipe segment would be similarly configured and may comprise sealing material between the inner diameter of the larger-diameter pipe and the outer diameter of the relatively smaller inner pipe, in the same fashion. As such, a substantially airtight passageway 220 is formed between the suction gripper mechanism 110 and the vacuum system 140 even as the telescoping member 210 extends and retracts during operation of the sorting robot 150. The particular dimensions of the pipes, particularly the inner diameters that define the airtight passageway 220, may be readily determined by one of ordinary skill in the art who has studied this disclosure based on a function of the volumetric cubic feet per minute that the telescoping suction gripper assembly 100 is designed to carry. It should be understood that although FIG. 2 illustrates an arrangement where the larger-diameter pipe 212-2 of the telescope member 210 is coupled to the suction gripper mechanism 110 and the relatively smaller inner pipe 212-1 coupled to the vacuum system 140, in other embodiments this arrangement can be reversed with the larger-diameter pipe 212-2 of the telescope member 210 coupled to vacuum system 140 and the relatively smaller inner pipe 212-1 coupled to the suction gripper mechanism 110.

Axial alignment between the pipes 212-1 and 212-2 may be maintained during extension and retraction operations of the telescoping member 210 by the combination of the seal material 214 and a bushing 218 (which may be implemented using a flange bearing) that seals the end of the larger pipe 212-2 where the smaller pipe 212-1 is inserted. In some embodiments, the seal 216 between each neighboring pipe 212 of the telescoping member 210 may be formed using a low friction seal material 214, so that the seal 216 functions as sliding seal in both the axial direction, and with respect to rotation about the axis of the telescoping member 210. In some embodiments, the low friction seal material 214 may comprise a packing seal material, for example, a material comprising a carbon impregnated thread filament or other material impregnated with carbon or graphite. The bushing 218 may comprise a low friction material such as a nylon material or ultra-high molecular weight polyethylene, or low friction wear-resistant Polytetrafluoroethylene (PTFE) or Teflon material. In some embodiments, the coefficient of kinetic friction ($\mu_k$) and/or coefficient of static friction ($\mu_s$) for the seal material 214 and/or bushing 218 are sufficiently low to facilitate unbinding motion. As a non-limiting example, in some embodiments the $\mu_k$ and/or $\mu_s$ for the seal material 214 and/or bushing 218 may be less than or equal to 0.2. As explained in greater detail below with respect to FIGS. 3A, 3B and 3C, as the distance between the robot actuator 154 and the gripper 110 changes, the two or more rigid nested pipes 212 are allowed to translate relative to each other along their axial direction. Axial alignment of the pipes 212 is maintained by the seal material 214 and the bushing 218. One or more of the pipes 212 of the telescoping member 210 thus may translate with respect to each other in both the axial and rotational directions while maintaining an airtight seal.

In some embodiments, a flexible conduit member 230 is coupled to the upper end of the telescoping member 210 to form a flexible airtight connection between the telescoping member 210 and a vacuum supply conduit 232. The vacuum supply conduit 232 is coupled to the vacuum system 140 so that an airflow generated by the vacuum system 140 (having either positive or negative airflow pressure) is communicated through to the telescoping member 210 and suction gripper mechanism 110. In some embodiments, the vacuum supply conduit 232 may be rigidly mounted to a surface of the sorting robot 150, or to another structure associated with the sorting robot 150. This upper flexible conduit member 230 permits the telescoping member 210 to pivot as the telescoping suction gripper assembly 100 is operated, and accommodates axial misalignment between the telescoping member 210 and the vacuum supply conduit 232.

As shown in FIG. 2, the telescoping suction gripper assembly 100 may also comprise a second, or lower, flexible conduit member 240. The flexible conduit member 240 is coupled to the lower portion of the airflow passage 220 of the telescoping member 210 to form a flexible airtight connection between the telescoping member 210 and the suction gripper mechanism 110. This lower flexible conduit member 240 permits this lower portion of the telescoping member 210 to pivot about the suction gripper mechanism 110 as the telescoping suction gripper assembly 100 is operated, and accommodates axial misalignment between the telescoping member 210 and the suction gripper mechanism 110.

In operation, the robot control logic and electronics 160 may be programmed to operate both the robotic arms 152 and the vacuum system 140 in a coordinated manner to perform what is referred to herein as executing a "capture action" or a "pick" on a target object 55. In some embodiments, in operation, a capture action comprises at least positioning the suction gripper mechanism 110 to aim at a target object 55, activating the vacuum system 140, and controlling the sorting robot 150 to move the suction gripper mechanism 110 towards the target object 55 to make contact while applying a vacuum to the surface of the target object 55. As this occurs, the telescoping suction gripper assembly 100 will self-adjust in length as needed in reaction to pulling or pushing forces placed upon it by the movement of the suction gripper mechanism 110. The response of the telescoping suction gripper assembly 100 in reconfiguring itself during the execution of such capture actions is illustrated by example in FIGS. 3A, 3B and 3C.

Figure 3A:
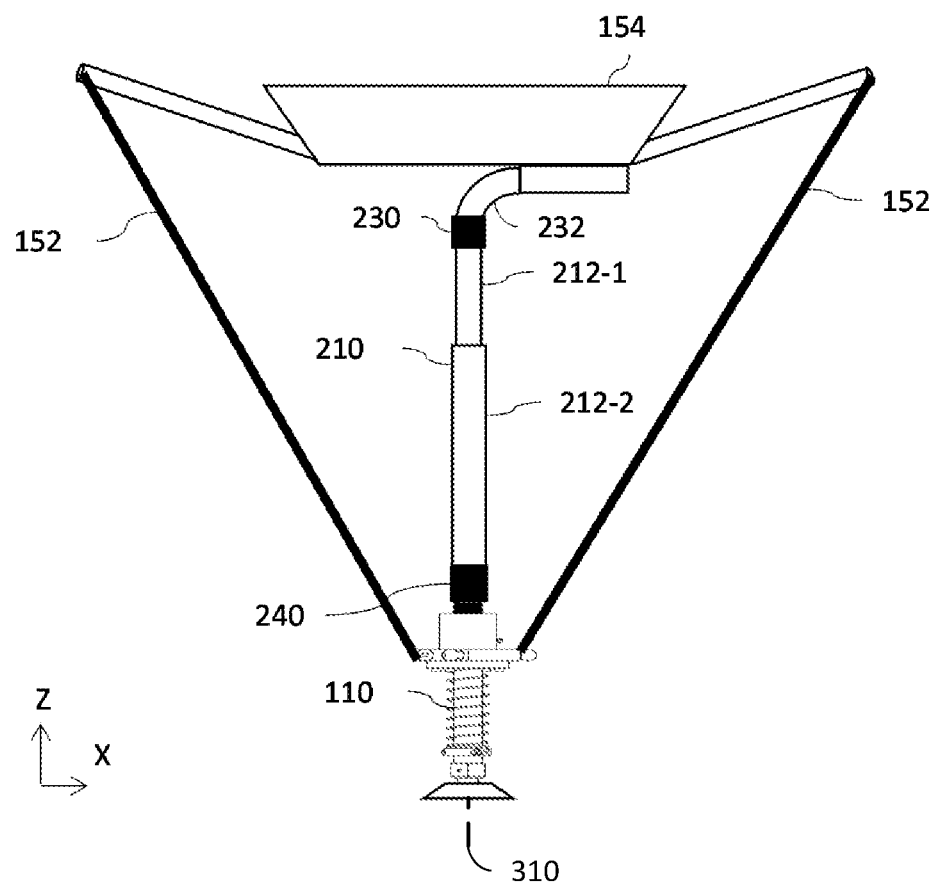
FIGS. 3A, 3B and 3C are diagrams illustrating the operation of an example telescoping suction gripper assembly in combination with a sorting robot for one embodiment of the present disclosure.
Figure 3B:
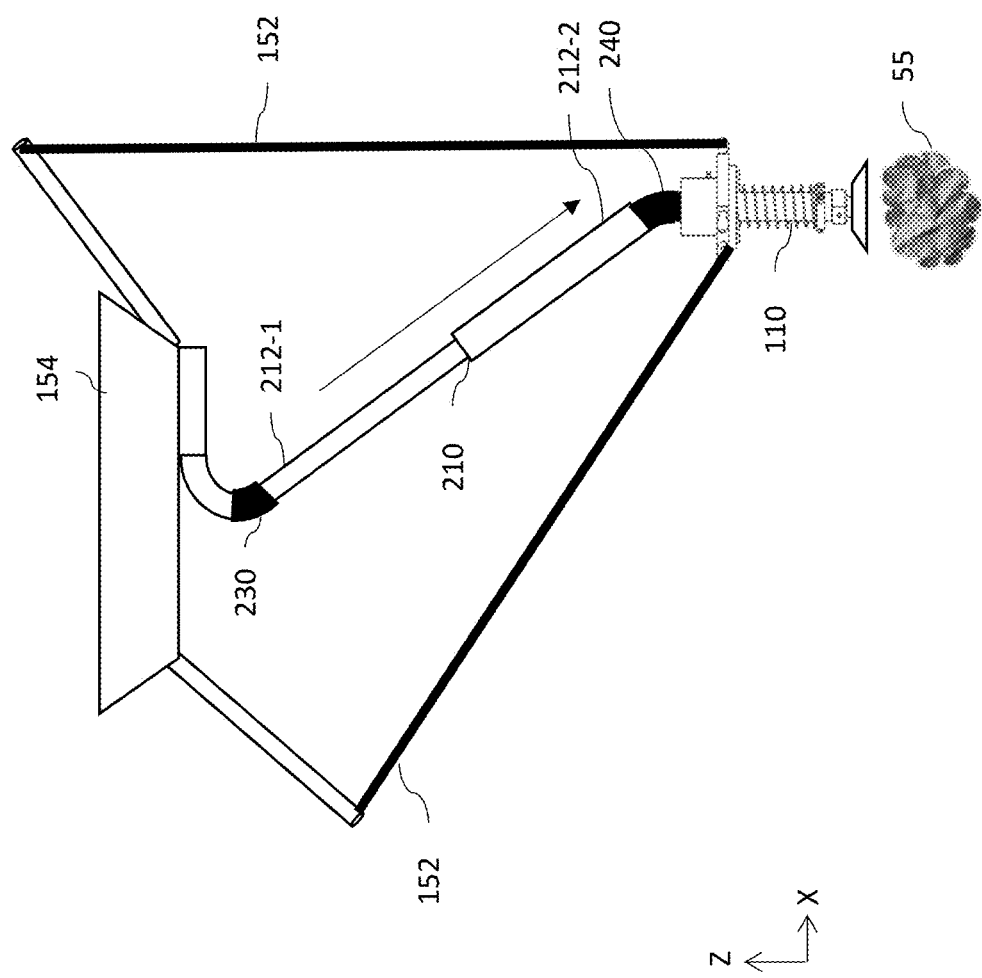
Figure 3C:
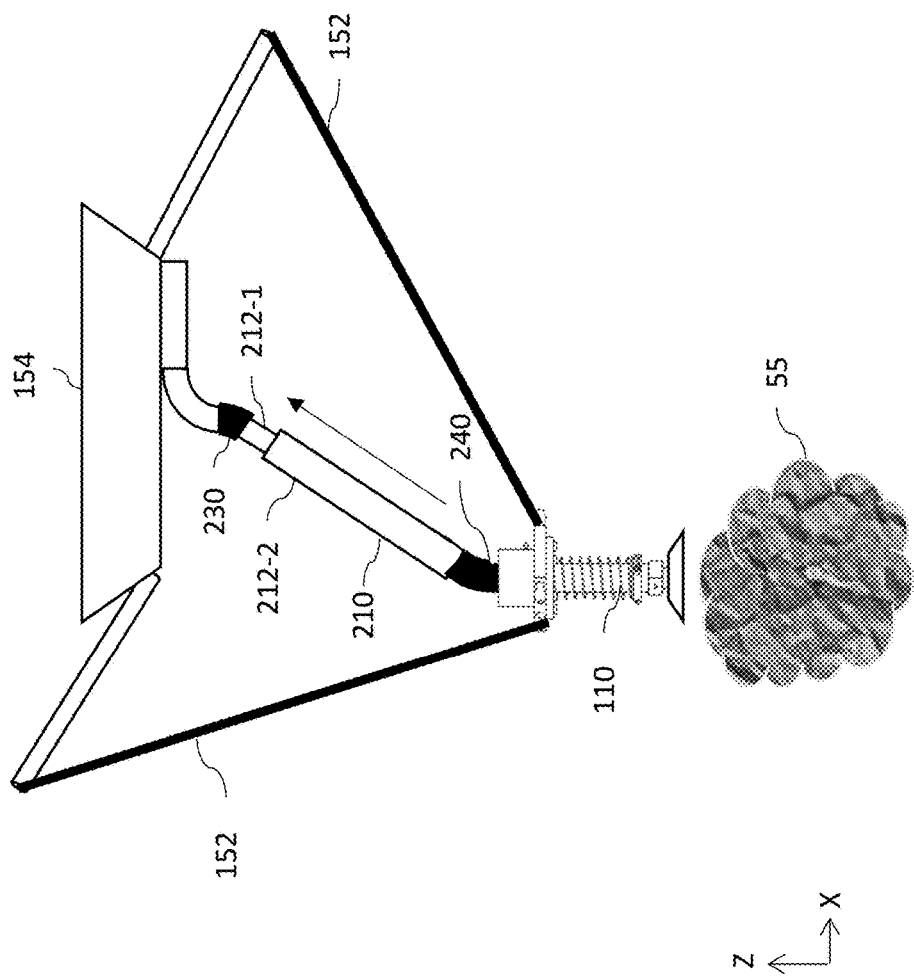

FIG. 3A illustrates the suction gripper mechanism 110 in an example "neutral" or "stand-by" position, for example between capture actions. In this example neutral position, the telescoping member 210 may be neither fully extended nor fully retracted. In some embodiments, operation of the robot arms 152 are controlled by the actuator 154 so that the orientation of the axis 310 of the suction gripper mechanism 110 remains constant. As the actuator 154 controls the robot arms 152 to reach for a target object 55, the motion causes the telescoping member 210 to extend in length as shown in FIG. 3B. The vacuum system 140 is controlled (by the robot control logic & electronics 160) to pull an airflow through the telescoping suction gripper assembly 100 so that a vacuum force at the suction gripper mechanism 110 is exerted to capture and hold the target object 55 (for removal from the conveyor 50, for example). In some embodiments, at the completion of each capture action, the robot control logic and electronics 160 controls the vacuum system 140 to optionally reverse the airflow through the suction gripper mechanism 110 so that a positive air is flowing out. Airflow reversal may serve not only to release and/or propel the target object 55 from the suction gripper mechanism 100, but also may serve purge dust from the telescoping suction gripper assembly 100 and/or vacuum system 140 as well as expel other materials (such as plastic bags or wraps) that may have been drawn into the internal airflow passage 220. FIG. 3C, in contrast to FIG. 3B, illustrates a retracted telescoping member 210 configuration, where there may be a minimum distance between the robot actuator 154 and the suction gripper mechanism 110. Such a retracted configuration may occur during a capture action where the target object 55 is relatively tall and the suction gripper mechanism 110 must be raised (e.g. above the neutral position) in order to be in position to capture and hold the target object 55, or in order to propel an already captured target object 55 from the conveyor 50. In this manner, the telescoping action of the telescoping suction gripper assembly 100 allows the sorting robot 150 to overcome the deficiencies of the prior art by allowing the uninterrupted delivery of high suction airflows to the suction gripper mechanism 110, at whatever position the sorting robot 150 needs to place the suction gripper mechanism 110 in order to capture and hold the target object 55, without interfering with the motion of the robot arms or experiencing tubing kinks, tears, or other tubing calamities.

FIG. 4 is a diagram illustrating a side view of an example suction gripper mechanism 110 of one embodiment of the present disclosure such as described with respect to FIG. 1. In this particular example embodiment, the suction gripper mechanism 110 comprises a body assembly 402 that houses a linear bearing component 409, and a mounting assembly 403 rigidly secured around the body assembly 402 that houses the linear bearing component 409.

In one embodiment, the mounting assembly 403 comprises a ring shaped assembly having a through hole through which the linear bearing component 409 is positioned and securely attached. In some embodiments, the mounting assembly 403 and the body assembly 402 may be rigidly coupled together such as through a weld or mechanical fastener. In some embodiments, the mounting assembly 403 and body assembly 402 may comprise a single integrated part. In this example embodiments, the mounting assembly 403 further comprises one or more mounting points 404 via which the mounting assembly 403 may be pivotally coupled to the robot arms 152 of the sorting robot 150.

In this example embodiment, the suction gripper mechanism 110 may further comprise a linear shaft element 401 secured within the linear bearing 409 and having a freedom to travel axially up and down with respect to the axis of the linear bearing 409. The linear shaft 401 comprises an internal airflow passage 420 configured to communicate an airflow (having either a positive or negative air pressure) between an airflow application port 407 positioned at a first end of the linear shaft 401 and a gripping port 406 positioned at the opposing second end of the linear shaft 401. The airflow application port 407 may be coupled to the telescoping member 210 by the lower flexible conduit member 240 to establish communication between the internal airflow passage 420 of the suction gripper mechanism 110 and the airflow passage 220 of the telescoping member 210. In some embodiments, a spring mechanism 405 may be positioned between the mounting assembly 403 and a stop device 412 located near the distal second end of the linear shaft 412 proximate to the gripper port 406, to hold the linear shaft 401 in a fully extended position when the suction gripper 110 is not holding a target object 55. When contact is made with the target object 55, the force of contact will cause the bottom end of linear shaft 401 to slide up into the linear bearing 409 (which will correspondingly cause the opposing top end of the linear shaft 401 to slide out from the linear bearing 409) and the spring mechanism 405 to compress. In this way, target objects of various dimensions can be accommodated without causing damage to components of the robot 150 from the force of impact. When the capture action is complete and the vacuum deactivated by the robot control logic and electronics 160, the spring mechanism 405 will extend the linear shaft 401 back to its fully extended position. A suction cup assembly 415 can be attached to the gripping port 406. In some embodiments, the suction cup assembly may comprise a flexible cup element 416 (which may be a rubber, latex, or other flexible material).

In some embodiments, the linear shaft 401 may also have a freedom of movement to rotate around the linear axis through the linear bearing 409. To address such embodiments (or other embodiments where components of the suction gripper 110 may axially rotate), the telescoping member 210 may accommodate this rotation without causing a binding of the telescoping suction gripper assembly 100 because the low friction characteristics of the seal material 214 and bushing 218 allow the pipe 212 segments of the telescoping member 210 to rotate with respect to each other. In some embodiments, the telescoping suction gripper assembly 100 may actively control the angle of rotation of the linear shaft 401 and/or suction cup assembly 415. For example, in one embodiment the telescoping suction gripper assembly 100 or suction gripper mechanism 110 may further comprise an actuator 440 to rotate the linear shaft 401 in order to articulate the orientation of the suction cup assembly 415 to better facilitate a capture action on a target object 55. Such an actuator 440 may be implemented, for example, using an electric motor coupled to the linear shaft 401 (for example, by gears, belts or other means) that is controlled by the logic and electronics 160 or other programmable logic controller (PLC).

Figure 5:
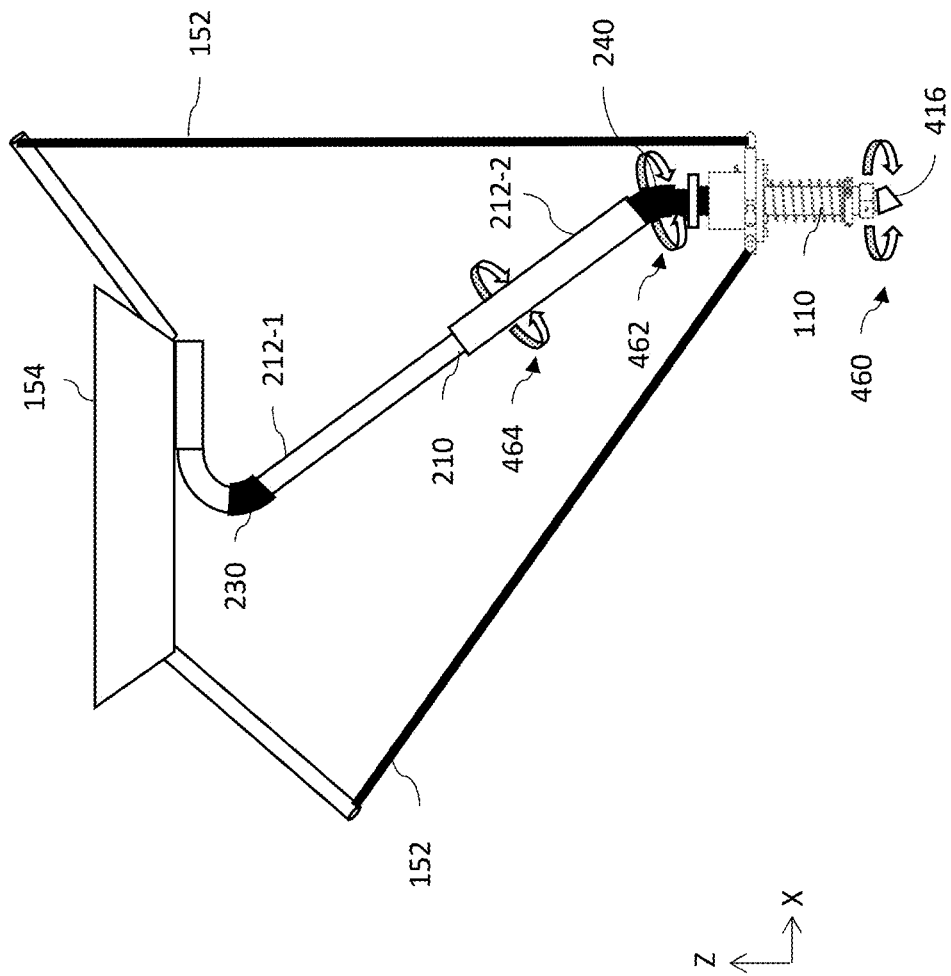
FIG. 5 is a diagram illustrating an example of suction gripper mechanism axial rotation in conjunction with a telescoping suction gripper assembly for one embodiment of the present disclosure.

In other embodiments, the rotation of the suction cup assembly 415 may be controlled by an actuator 440 in order to facilitate automatic replacement of the flexible cup element 416. For example, as shown in FIG. 4A, the robot control logic and electronics 160 may reposition and insert the suction gripper mechanism 110 partially inserted into a tool changer 480 that hold the flexible cup element 416 while rotation of the suction cup assembly 415 by actuator 440 causes the flexible cup element 416 to release from the suction gripper mechanism 110. The robot control logic and electronics 160 may then reposition the suction gripper mechanism 110 to accept a new flexible cup element 416 from the tool changer 480. Actuator 440 may then rotate the suction cup assembly 415 to cause the new flexible cup element 416 to secure to the suction gripper mechanism 110. Flexible cup element 416 replacement may be performed, for example, to replace a damaged or worn flexible cup element 416, or for other reasons such as to replace one flexible cup element 416 with another that is more suited for the particular target objects 55 that need to be captured. As illustrated in FIG. 5, the design of the telescoping suction gripper assembly 100, particularly the telescoping member 210, facilitates such rotational movements of the suction gripper mechanism 110. The rotational movement at the suction gripper mechanism 110 (shown at 460) is translated into the telescoping member 210 by the flexible conduit member 240 (shown at 462), and the low friction characteristics of the seal material 214 and bushing 218 allow the pipe 212 segments (e.g. 212-2 and 212-2) of the telescoping member 210 to rotate with respect to each other (as shown at 464).

EXAMPLE EMBODIMENTS

Example 1 includes a robotic system, the system comprising: a robot comprising a robotic actuator and at least one robotic arm mechanically coupled to the robotic actuator; a telescoping suction gripper assembly comprising a telescoping member and a suction gripper mechanism, wherein a first end of the telescoping member is coupled to a vacuum supply conduit via a first flexible conduit member and a second end of the telescoping member is coupled to the suction gripper mechanism by a second flexible conduit member, and wherein the suction gripper mechanism is pivotally coupled to the at least one robotic arm; wherein the telescoping member is configured to adjust in length in response to the at least one robotic arm relocating the suction gripper mechanism from a first position to a second position.

Example 2 includes the system of any example 1, further comprising: a reversible vacuum system coupled to the suction gripper mechanism via the telescoping suction gripper assembly, wherein the telescoping suction gripper assembly includes an airflow passage coupling the reversible vacuum system to the suction gripper mechanism.

Example 3 includes the system of example 2, wherein the vacuum supply conduit is rigidly mounted to either a surface of the robot or to a structure supporting the robot.

Example 4 includes the system of any of examples 2-3, further comprising: robot control logic and electronics coupled to the sorting robot and the reversible vacuum system, wherein the robot control logic and electronics outputs one or more control signals to control the one or more robotic arms of the sorting robot, and outputs one or more airflow control signals to the reversible vacuum system, to execute a capture action on at least one target object based on an image signal form an imaging device.

Example 5 includes the system of example 4, wherein during the capture action, the robot control logic and electronics outputs control signals such that the reversible vacuum system first pulls a vacuum through the telescoping suction gripper assembly as the suction gripper mechanism is applied to capture and hold the target object and subsequently reverses air pressure to purge air from the telescoping suction gripper assembly.

Example 6 includes the system of any of examples 1-5, wherein the suction gripper mechanism is centered between at least two robotic arms of the robot.

Example 7 includes the system of any of examples 1-6, wherein the telescoping member further comprises a plurality of telescoping pipes that include at least a first pipe and a second pipe, wherein the first pipe has an outer diameter sized and shaped to fit inside the second pipe.

Example 8 includes the system of example 7, the telescoping member further comprising a seal material configured to form a seal between the inner diameter of the first pipe and the second pipe.

Example 9 includes the system of example 8, the seal material comprising a low friction material, a carbon impregnated thread filament material, or a material comprising carbon or graphite.

Example 10 includes the system of any of examples 8-9, wherein the seal comprises a sliding seal in both the axial direction and with respect to rotation about a longitudinal axis of the telescoping member.

Example 11 includes the system of any of examples 8-10, the telescoping member further comprising a bushing configured to form a seal at an opening of the second pipe where the first pipe is inserted into the second pipe.

Example 12 includes the system of example 11, wherein the bushing comprises at least one of: a flange bearing, a nylon material, an ultra-high molecular weight polyethylene, a low friction wear-resistant Polytetrafluoroethylene (PTFE), or a Teflon material.

Example 13 includes the system of any of examples 11-12, wherein either a coefficient of kinetic friction ($\mu_k$) or a coefficient of static friction ($\mu_s$) for either the seal material or the bushing is less than or equal to 0.2.

Example 14 includes the system of any of examples 1-13, wherein the suction gripper mechanism comprises: a body assembly that houses a linear bearing component; a linear shaft element secured within the linear bearing and having a freedom to travel axially up and down with respect to an axis of the linear bearing; an internal airflow passage within the linear shaft configured to communicate an airflow between an airflow application port coupled to the telescoping member at a first end of the linear shaft and a gripping port positioned at an opposing second end of the linear shaft; a suction cup assembly comprising a flexible cup element coupled to the gripping port by a removable coupler.

Example 15 includes the system of example 14, wherein the linear shaft and suction cup assembly are configured with a freedom to rotate about the axis of the linear bearing, and wherein at least one pipe component of the telescoping member is configured to rotate in response the rotation of the linear shaft and suction cup.

Example 16 includes the system of any of examples 14-15, wherein the suction gripper mechanism further comprises an actuator configured to rotate the linear shaft in order to articulate an orientation of the suction cup assembly; wherein at least one pipe component of the telescoping member is configured to rotate in response the rotation of the linear shaft and suction cup.

Example 17 includes a telescoping suction gripper assembly, the assembly comprising: a telescoping member; a suction gripper mechanism; a first flexible conduit member configured to couple the telescoping member to a vacuum supply conduit of a vacuum system; a second flexible conduit member configured to couple the telescoping member to the suction gripper mechanism, wherein the first flexible conduit member, the second flexible conduit member, and the telescoping member define an adjustable length airflow passage between the vacuum supply conduit and the suction gripper mechanism; wherein the telescoping member further comprises a plurality of telescoping pipes that include at least a first pipe and a second pipe, wherein the first pipe has an outer diameter sized and shaped to fit inside the second pipe, the telescoping member further comprising a seal material configured to form a seal between the inner diameter of the first pipe and the second pipe, the seal material comprising a low friction material, the seal comprising a sliding seal in both the axial direction and with respect to rotation about a longitudinal axis of the telescoping member.

Example 18 includes the assembly of example 17, the telescoping member further comprising a bushing configured to form a seal at an opening of the second pipe where the first pipe is inserted into the second pipe.

Example 19 includes the assembly of any of examples 17-18, wherein the suction gripper mechanism comprises: a body assembly that houses a linear bearing component; a linear shaft element secured within the linear bearing and having a freedom to travel axially up and down with respect to an axis of the linear bearing; an internal airflow passage within the linear shaft configured to communicate an airflow between an airflow application port coupled to the telescoping member at a first end of the linear shaft and a gripping port positioned at an opposing second end of the linear shaft; a suction cup assembly comprising a flexible cup element coupled to the gripping port by a removable coupler.

Example 20 includes the assembly of example 19, wherein the linear shaft and suction cup assembly are configured with a freedom to rotate about the axis of the linear bearing, and wherein at least one of the plurality of pipes of the telescoping member is configured to rotate in response the rotation of the linear shaft and suction cup.

Example 21 includes the assembly of examples 19-20, wherein the suction gripper mechanism further comprises an actuator configured to rotate the linear shaft in order to articulate an orientation of the suction cup assembly; wherein at least one of the plurality of pipes of the telescoping member is configured to rotate in response the rotation of the linear shaft and suction cup.

In various alternative embodiments, system elements, method steps, or examples described throughout this disclosure (such as the sorting robot, robot control logic & electronics, imaging devices, vacuum system, and/or subparts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A robotic system, the robotic system comprising:
a robot comprising a robotic actuator and at least one robotic arm mechanically coupled to the robotic actuator;
a telescoping suction gripper assembly comprising a telescoping member and a suction gripper mechanism, wherein a first end of the telescoping member is coupled to a vacuum supply conduit via a first flexible conduit member and a second end of the telescoping member is coupled to the suction gripper mechanism by a second flexible conduit member, and wherein the suction gripper mechanism is pivotally coupled to the at least one robotic arm, wherein the telescoping member further comprises a plurality of telescoping pipes that includes at least a first pipe and a second pipe, wherein the first pipe has an outer diameter sized and shaped to fit inside the second pipe, wherein the telescoping member further comprising a seal material configured to form a seal between an inner diameter of the first pipe and the second pipe, wherein the seal comprises a sliding seal in both the axial direction and with respect to rotation about a longitudinal axis of the telescoping member; and
wherein the telescoping member is configured to adjust in length in response to the at least one robotic arm relocating the suction gripper mechanism from a first position to a second position.

2. The robotic system of claim 1, further comprising:
a reversible vacuum system coupled to the suction gripper mechanism via the telescoping suction gripper assembly, wherein the telescoping suction gripper assembly includes an airflow passage coupling the reversible vacuum system to the suction gripper mechanism.

3. The robotic system of claim 2, further comprising:
robot control logic and electronics coupled to the robot and the reversible vacuum system, wherein the robot control logic and electronics outputs one or more control signals to control the at least one robotic arm, and outputs one or more airflow control signals to the reversible vacuum system; and
wherein the robot control logic and electronics coordinates the one or more control signals and the one or more airflow control signals to execute a capture action on at least one target object.

4. The robotic system of claim 3, wherein the robot control logic and electronics identifies the at least one target object based on an image signal from an imaging device.

5. The robotic system of claim 3, wherein during the capture action, the robot control logic and electronics outputs control signals such that the reversible vacuum system first pulls a vacuum through the telescoping suction gripper assembly as the suction gripper mechanism is applied to capture and hold the at least one target object and subsequently reverses air pressure to purge air from the telescoping suction gripper assembly.

6. The robotic system of claim 1, wherein the suction gripper mechanism is centered between at least two robotic arms of the robot.

7. The robotic system of claim 1, the seal material comprising a low friction material, a carbon impregnated thread filament material, or a material comprising carbon or graphite.

8. The robotic system of claim 1, the telescoping member further comprising a bushing configured to form a seal at an opening of the second pipe where the first pipe is inserted into the second pipe.

9. The robotic system of claim 8, wherein the bushing comprises at least one of: a flange bearing, a nylon material, an ultra-high molecular weight polyethylene, a low friction wear-resistant Polytetrafluoroethylene (PTFE), or a Teflon material.

10. The robotic system of claim 8, wherein either a coefficient of kinetic friction ($\mu_k$) or a coefficient of static friction ($\mu_s$) for either the seal material or the bushing is less than or equal to 0.2.

11. The robotic system of claim 1, wherein the suction gripper mechanism comprises:
a body assembly that houses a linear bearing component;
a linear shaft element secured within the linear bearing component and having a freedom to travel axially up and down with respect to an axis of the linear bearing component;
an internal airflow passage within the linear shaft element configured to communicate an airflow between an airflow application port coupled to the telescoping member at a first end of the linear shaft element and a gripping port positioned at an opposing second end of the linear shaft element; and
a suction cup assembly comprising a flexible cup element coupled to the gripping port by a removable coupler.

12. The robotic system of claim 11, wherein the linear shaft element and the suction cup assembly are configured with a freedom to rotate about the axis of the linear bearing component, and wherein at least one pipe component of the telescoping member is configured to rotate in response to rotation of the linear shaft element and the suction cup assembly.

13. A telescoping suction gripper assembly, the telescoping suction gripper assembly comprising:
a telescoping member;
a suction gripper mechanism;
a first flexible conduit member configured to couple the telescoping member to a vacuum supply conduit of a vacuum system;
a second flexible conduit member configured to couple the telescoping member to the suction gripper mechanism, wherein the first flexible conduit member, the second flexible conduit member, and the telescoping member define an adjustable length airflow passage between the vacuum supply conduit and the suction gripper mechanism; and
wherein the telescoping member further comprises a plurality of telescoping pipes that includes at least a first pipe and a second pipe, wherein the first pipe has an outer diameter sized and shaped to fit inside the second pipe, the telescoping member further comprising a seal material configured to form a first seal between an inner diameter of the first pipe and the second pipe, the seal material comprising a low friction material, the first seal comprising a sliding seal in both the axial direction and with respect to rotation about a longitudinal axis of the telescoping member.

14. The telescoping suction gripper assembly of claim 13, the telescoping member further comprising a bushing configured to form a second seal at an opening of the second pipe where the first pipe is inserted into the second pipe.

15. The telescoping suction gripper assembly of claim 14, wherein either a coefficient of kinetic friction ($\mu_k$) or a coefficient of static friction ($\mu_s$) for either the seal material or the bushing is less than or equal to 0.2.

16. The telescoping suction gripper assembly of claim 13, wherein the suction gripper mechanism comprises:
   a body assembly that houses a linear bearing component;
   a linear shaft element secured within the linear bearing component and having a freedom to travel axially up and down with respect to an axis of the linear bearing component;
   an internal airflow passage within the linear shaft element configured to communicate an airflow between an airflow application port coupled to the telescoping member at a first end of the linear shaft element and a gripping port positioned at an opposing second end of the linear shaft element; and
   a suction cup assembly coupled to the gripping port.

17. The telescoping suction gripper assembly of claim 16, wherein the linear shaft element and the suction cup assembly are configured with a freedom to rotate about the axis of the linear bearing component, and wherein at least one of the plurality of telescoping pipes of the telescoping member is configured to rotate in response to the rotation of the linear shaft element and the suction cup assembly.

\* \* \* \* \*